United States Patent
Ahn

(10) Patent No.: US 6,971,858 B2
(45) Date of Patent: Dec. 6, 2005

(54) ANTI-LOCK BRAKE SYSTEM PUMP HOUSING

(75) Inventor: Dong-Ho Ahn, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 0 days.

(21) Appl. No.: 10/322,418

(22) Filed: Dec. 19, 2002

(65) Prior Publication Data

US 2004/0013549 A1 Jan. 22, 2004

(30) Foreign Application Priority Data

Jul. 16, 2002 (KR) .................. 10-2002-0041689

(51) Int. Cl.[7] .................. F04B 1/04; F04B 17/00; B60T 8/36
(52) U.S. Cl. .................. 417/273; 417/415; 303/119.3; 137/884
(58) Field of Search .................. 303/119.3, 119.1; 137/884; 417/273, 415, 439, 521, 522, 313

(56) References Cited

U.S. PATENT DOCUMENTS

| 5,271,667 A | * | 12/1993 | Takata et al. | ............. 303/113.2 |
| 5,449,226 A | * | 9/1995 | Fujita et al. | ............. 303/116.4 |
| 5,460,438 A | * | 10/1995 | Hellmann et al. | ........ 303/119.3 |
| 5,567,022 A | * | 10/1996 | Linkner, Jr. | .................. 303/87 |
| 5,567,128 A | * | 10/1996 | Volz et al. | .................. 417/313 |

FOREIGN PATENT DOCUMENTS

| JP | 6-179362 | 6/1994 |
| KR | 10-0168438 | 10/1998 |
| KR | 2000-0014528 | 7/2000 |
| KR | 20-0268694 | 3/2002 |

* cited by examiner

Primary Examiner—Timothy P. Solak
(74) Attorney, Agent, or Firm—Greenblum & Bernstein, P.L.C.

(57) ABSTRACT

The present invention relates to an ABS pump housing. The ABS pump housing includes: a motor-receiving unit, a pump-receiving unit, an entrance solenoid valve, an exit solenoid valve and an accumulator-receiving unit, wherein the accumulator-receiving unit comprises: a first chamber, a second chamber arranged above the first chamber and having a diameter smaller than that of the first chamber, a first communication port for communicating the first chamber with the pump-receiving unit and a second communication port for communicating the second chamber with an exit solenoid valve-receiving unit in a rear end of the pump housing. A flow path of the first communication port communicating with the pump-receiving unit is readily formed in a large size. The second chamber is formed to communicate with the exit solenoid valve in the exit side so that any additional communication port is not necessary, by which the pump housing is downsized and light-weighted.

2 Claims, 2 Drawing Sheets

[FIG. 1] PRIOR ART
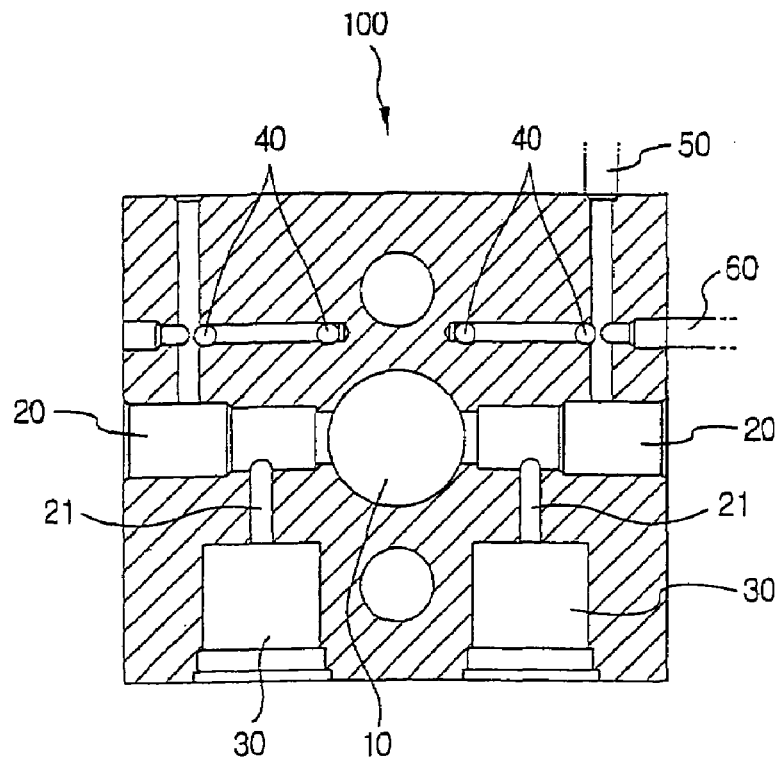
[FIG. 2] PRIOR ART
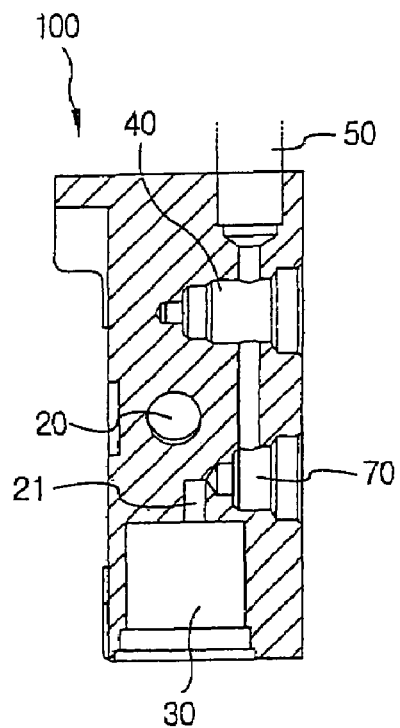

[FIG. 3]
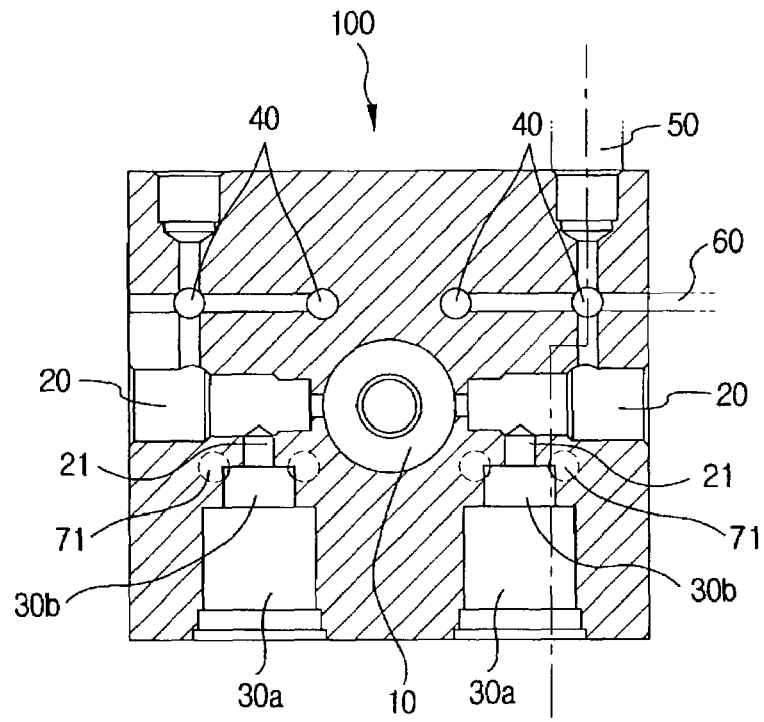
[FIG. 4]
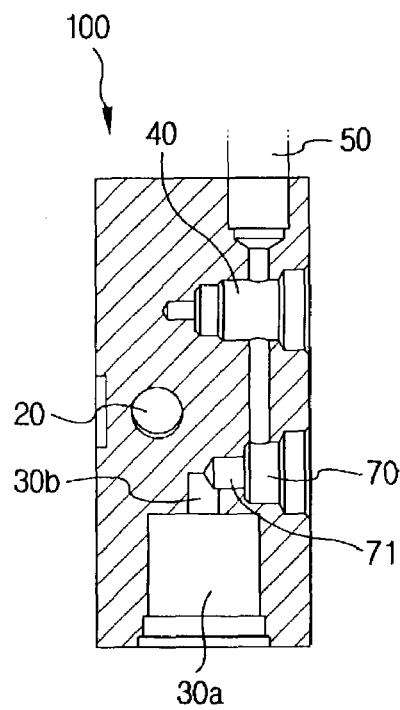

ANTI-LOCK BRAKE SYSTEM PUMP HOUSING

BACKGROUND OF THE INVENTION

1. Field of the Invention

The present invention relates to an Anti-lock Brake System (ABS) pump housing, in particular, in which an accumulator-receiving unit communicating with a pump-receiving unit has first and second chambers, a first communication port connected to the pump-receiving unit is provided above the second chamber, and an exit solenoid valve-receiving unit communicates with a rear end of the second chamber, by which any additional flow path is not necessarily formed and the ABS pump housing is light-weighted.

2. Description of the Related Art

In general, when a running vehicle mounted with a brake system suddenly brakes on a slippery road, wheels are fixed. Then, brake power is decreased, the braking distance is increased, spin takes place slipping aside the vehicle, and a steering wheel is substantially out of control.

In an anti-lock brake system, an ECU estimates the velocity of the wheels and a vehicle body based upon signals from wheel velocity sensors. After a driver treads on a brake pedal, when the wheel velocity is decelerated under a pre-selected control standard, brake oil pressure is decreased. On the contrary, if the wheel velocity is too high, brake oil pressure is enhanced.

As above, brake oil pressure is decreased according to wheel velocity so that a tire is not wound or repeatedly maintained or increased to induce stable braking action thereby ensuring stability about the direction of the vehicle to prevent spin, ensure steering ability and reduce the braking distance.

The operation principle of the conventional anti-lock brake system having the above functions will be described as follows in reference to Korean Utility-Model Registration No. 20-0268694, Korean Utility-Model Publication No. 2000-0014528, Korean Patent Registration No. 10-0168438 and Japanese Patent Application Publication No. H06-179362.

FIG. 1 is a front sectional view of a conventional ABS pump housing, and FIG. 2 is a side sectional view of the conventional ABS pump housing.

As shown in FIGS. 1 and 2, the conventional ABS pump housing includes a motor-receiving unit 10 for receiving a motor in a central portion, pump-receiving units 20 arranged at both sides of the motor-receiving unit 10 and for allowing pistons to be mounted thereon in a horizontally reciprocating manner, first communication ports 21 arranged under and communicating with the pump-receiving unit 10 and an accumulator-receiving unit 30 connected to the first communication ports 21 and for temporarily storing hydraulic oil exhausted from the pump-receiving unit 20.

Further the pump-receiving units 20 each communicate with an entrance solenoid valve-receiving unit 40, which communicates with a channel 50 leading to a master cylinder-receiving unit (not shown). The entrance solenoid valve-receiving unit 40 communicates at one side with a channel 60 leading to a wheel-cylinder receiving unit (not shown), and at the other side with another entrance solenoid valve-receiving unit 40. Also the entrance solenoid valve-receiving unit 40 communicates with an exit solenoid valve-receiving unit 70.

Detailed description will be made about each of the components in the ABS pump housing of a vehicle as set forth above as follows.

First, the entrance solenoid valve-receiving unit 40 for receiving a solenoid valve (not shown) is in the form a valve for adjusting a channel, which connects hydraulic oil injected from the master cylinder-receiving unit to the vehicular wheel cylinder-receiving unit. Ordinarily, the entrance solenoid valve-receiving unit 40 is opened to connect between the master cylinder-receiving unit and the wheel cylinder-receiving unit. However, where it is required to fix a vehicle in braking operation, an ECU applies an electric signal to a coil wrapping a solenoid valve to generate a magnetic field shutting the channels.

The exit solenoid valve-receiving unit 70 is in the form of a valve for opening/shutting channels of the wheel cylinder-receiving unit and the accumulator-receiving units 30. The exit solenoid valve-receiving unit 70 ordinarily shuts the channels. When it is judged to reduce the braking pressure of the wheel cylinder-receiving unit, the ECU applies the electric signal to the coil wrapping the exit solenoid valve to generate the magnetic field thereby shutting channels.

In the meantime, when the pump-receiving units 20 return hydraulic oil from the wheel cylinder-receiving units toward the master cylinder-receiving units, the accumulator-receiving units 30 function to damp the pressure of liquid oil since returned hydraulic oil has a high pressure. When hydraulic oil returns by a large quantity, the accumulator-receiving units 30 function as chambers for temporarily storing hydraulic oil.

The pump-receiving units 20 function to return hydraulic oil from the wheel cylinder-receiving units toward the mater cylinder-receiving units. The pump-receiving units 20 are actuated under rotation of cams connected to the motor-receiving unit 10 which internally mounts a motor (not shown) in a central portion of the pump housing 100 so as to suck hydraulic oil from the accumulator-receiving units 30 toward the master cylinder-receiving units.

The following description will disclose flow paths of hydraulic oil in the conventional ABS pump housing having the above construction.

Hydraulic oil is introduced from the master cylinder-receiving units via the entrance solenoid valve-receiving units 40 into the wheel cylinder-receiving units.

At this time, the wheel cylinder-receiving units operate to execute braking action.

Although hydraulic oil is simultaneously introduced into the pump-receiving units 20, the pump-receiving units 20 are cut off so that hydraulic oil does not further proceed.

When excessive hydraulic oil is introduced to generate wheel lock, the ECU executes a control function to maintain the pressure, which is generally referred to as a pressure maintenance mode.

At this time, the opened entrance solenoid valve-receiving units 40 are shut, and the exit solenoid valve receiving-units 70 are also shut as above.

However, if the wheel lock proceeds as ever, the ECU controls the pressure, which is referred to as a decompression mode.

When the decompression mode is set, the entrance solenoid valve-receiving units 40 maintains the shut position, and the exit solenoid valve-receiving units 70 are opened from the closed position.

Then, hydraulic oil moves from the wheel cylinder-receiving units via the exit solenoid valve-receiving units 70 toward the accumulator-receiving units 30.

The pistons execute reciprocating motion within the pump receiving units 20 to suck hydraulic oil discharged from the accumulator-receiving units 30 and the wheel cylinder-receiving units.

The accumulator-receiving units 30 maintain the pressure while continuously providing a certain amount of hydraulic oil to the pump-receiving units 20. When the pistons are actuated by the pump-receiving units 20, the pressure is raised for a certain amount over that applied in braking action.

Hydraulic oil is pressed in the pump-receiving units 20, and discharged toward the wheel cylinder-receiving units via the entrance solenoid valve-receiving units 40.

Treading a brake pedal generates oil pressure, releasing the pedal causes pressed hydraulic oil to return toward the master cylinder-receiving units suspending braking action.

In the conventional ABS pump housing 100 having the above construction and operation, the flow paths respectively made for connecting the exit solenoid valve-receiving units 70 and the accumulator-receiving units 30. In connection of the first communication ports 21 for connecting between the accumulator-receiving units 30 and the pump-receiving units 20, flow paths are made eccentric from the centers of the accumulator-receiving units 30.

These increase time and cost for making the flow paths, and precision of processing is required for making the narrow flow paths.

SUMMARY OF THE INVENTION

The present invention has been made to solve the foregoing problems and it is therefore an object of the present invention to provide an Anti-lock Brake System (ABS) pump housing, in particular, in which an accumulator-receiving unit communicating with a pump-receiving unit has first and second chambers, a first communication port connected to the pump-receiving unit is provided above the second chamber, and an exit solenoid valve-receiving unit communicates with a rear end of the second chamber, by which the flow path for connecting between the accumulator-receiving unit and the exit solenoid valve-receiving unit is shortened and the ABS pump housing is light-weighted.

According to an aspect of the invention to obtain the above objects, it is provided an ABS pump housing which includes: a motor-receiving unit, a pump-receiving unit, an entrance solenoid valve, an exit solenoid valve and an accumulator-receiving unit, wherein the accumulator-receiving unit comprises: a first chamber; a second chamber arranged above the first chamber and having a diameter smaller than that of the first chamber; a first communication port for communicating the first chamber with the pump-receiving unit; and a second communication port for communicating the second chamber with an exit solenoid valve-receiving unit in a rear end of the pump housing.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a front sectional view of a conventional ABS pump housing;

FIG. 2 is a side sectional view of the conventional ABS pump housing;

FIG. 3 is a front sectional view of an ABS pump housing of the invention; and FIG. 4 is a side sectional view of the ABS pump housing of the invention.

DETAILED DESCRIPTION OF THE PREFERRED EMBODIMENT

The following detailed description will present an ABS pump housing according to a preferred embodiment of the invention in reference to the accompanying drawings.

FIG. 3 is a front sectional view of an ABS pump housing of the invention, and FIG. 4 is a side sectional view of the ABS pump housing of the invention.

The ABS pump housing of the invention has a general construction and flow paths substantially identical with those of the conventional ABS pump housing, and thus detailed description thereof will be omitted.

As shown in FIGS. 3 and 4, the description will be made only about accumulator-receiving units which are important parts of the invention.

First, the accumulator-receiving units 30 each have the first chamber 30*a* and the second chamber 30*b* above the first chamber 30*a*.

The second chamber 30*b* has a diameter smaller than that of the first chamber 30*a* and the first communication port 21 for connecting between the second chamber 30*b* and the pump housing 20.

In order to communicate with an exit solenoid valve-receiving unit 70 in the rear end of the pump housing 100, the second chamber 30*b* has a flow path connected to the second communication port 71.

According to the ABS pump housing 100 of the invention as set forth above, the first communication port 21 is formed concentric connecting with the first chamber 30*a* and the second chamber 30*b* so that the flow path is readily formed and enlarged in diameter. Damping effect of the accumulator-receiving unit 30 is partially divided. The flow path for connecting between the accumulator-receiving unit 30 and the exit solenoid valve-receiving unit 70 is shortened. Time and cost are reduced, productivity is enhanced, and downsizing is obtained while the pump housing 100 can be light weighted.

The ABS pump housing of the invention as set forth above has the following effects.

First, the accumulator-receiving unit forms the second chamber above the first chamber so that the flow path of the first communication port communicating with the pump-receiving unit is readily formed in a large size.

Second, the flow path of the first communication port connecting the accumulator-receiving unit and the pump-receiving unit is formed concentric with the first and second chambers without variation of the center line in machining thereby reducing machining time.

Third, the second chamber is formed to enlarge the diameter of the flow path of the first communication port so that the damping effect of the accumulator is partially divided.

Fourth, the second chamber is formed to communicate with the exit solenoid valve in the exit side so that any additional communication port is not necessary.

What is claimed is:

1. An ABS pump housing comprising a motor-receiving unit, a pump-receiving unit, an entrance solenoid valve receiving unit, an exit solenoid valve receiving unit and an accumulator-receiving unit, the entrance solenoid valve receiving unit and the exit solenoid valve receiving unit being located on opposite sides of the pump receiving unit, wherein the accumulator-receiving unit comprises:

a first chamber;

a second chamber provided on the first chamber and having a diameter smaller than that of the first chamber;

a first communication port that communicates the second chamber with the pump-receiving unit;

a second communication port that communicates the second chamber with the exit solenoid valve-receiving unit; and wherein the second communication port is oriented generally perpendicular to longitudinal directions of the pump-receiving unit and the first chamber.

2. The ABS pump housing in accordance with claim 1, wherein the first chamber, the second chamber and the first communication port are provided to one another concentric in the accumulator-receiving unit.

* * * * *